United States Patent
Kim et al.

(10) Patent No.: US 7,625,611 B2
(45) Date of Patent: Dec. 1, 2009

(54) COMPOSITION FOR LIQUID CRYSTAL ALIGNING, LIQUID CRYSTAL ALIGNING LAYER PREPARED FROM THE SAME, AND LIQUID CRYSTAL DISPLAY COMPRISING THE SAME

(75) Inventors: Kyung-Jun Kim, Daejeon (KR); Yun-Jeong Lee, Daejeon (KR); Sang-Kook Kim, Goyang-si (KR); Hye-Ran Seong, Seoul (KR); Dong-Hyun Oh, Seoul (KR); Jung-Ho Jo, Anyang-si (KR)

(73) Assignee: LG Chem. Ltd., Seoul (KR)

( * ) Notice: Subject to any disclaimer, the term of this patent is extended or adjusted under 35 U.S.C. 154(b) by 377 days.

(21) Appl. No.: 11/649,163

(22) Filed: Jan. 4, 2007

(65) Prior Publication Data
US 2007/0154656 A1    Jul. 5, 2007

(30) Foreign Application Priority Data
Jan. 4, 2006   (KR) .................... 10-2006-0000990

(51) Int. Cl.
*C09K 19/00* (2006.01)
*C09K 19/06* (2006.01)
*C09K 19/52* (2006.01)

(52) U.S. Cl. .............. 428/1.2; 428/1.25; 428/1.26; 430/20; 430/270.1; 252/299.01

(58) Field of Classification Search ......... 428/1.2, 428/1.25, 1.26; 430/20, 270.1; 252/299.01
See application file for complete search history.

(56) References Cited

U.S. PATENT DOCUMENTS 5,607,732 A  *  3/1997  Miyamoto et al. ......... 428/1.26
6,218,501 B1    4/2001  Choi et al.
6,808,766 B1 * 10/2004  Miyama et al. ............ 428/1.25

FOREIGN PATENT DOCUMENTS

JP    2005-037920     2/2005
KR    10-2004-0108129 A  12/2004
WO    WO 2004/072719 A1  8/2004

* cited by examiner

Primary Examiner—Geraldina Visconti
(74) Attorney, Agent, or Firm—McKenna Long & Aldridge LLP

(57) ABSTRACT

The present invention to a composition for liquid crystal aligning comprising an oligoimide or oligoamic acid, which comprises a thermocurable or photocurable functional group on at least one end of the oligoimide or oligoamic acid backbone, a liquid crystal aligning layer prepared from the same, and a liquid crystal display comprising the same. The composition for liquid crystal aligning according to the present can minimize the generation of the decomposed by-products, which had been generated upon the use of polyimides, by using an oligoimide or oligoamic acid on at least one end of the backbone, instead of the conventional polyimides and has an excellent effect of improvement in alignment property, thermal stability, and image sticking.

24 Claims, No Drawings

COMPOSITION FOR LIQUID CRYSTAL ALIGNING, LIQUID CRYSTAL ALIGNING LAYER PREPARED FROM THE SAME, AND LIQUID CRYSTAL DISPLAY COMPRISING THE SAME

This application claims the benefit of Korean Patent Application No. 10-2006-0000990, filed on Jan. 4, 2006, which is hereby incorporated by reference for all purposes as if fully set forth herein.

TECHNICAL FIELD

The present invention relates to a composition for liquid crystal aligning, a liquid crystal aligning layer prepared from the same, and a liquid crystal display comprising the same.

This application claims priority from Korean Patent Application No. 10-2006-0000990 filed on Jan. 4, 2006 in the Korean Intellectual Property Office, the disclosure of which is incorporated herein by reference in its entirety.

BACKGROUND ART

In accordance with the advance in the display industry, a low driving voltage, realization of high resolution, reduction in volume of a monitor, and flatness of a monitor have been provided, and thus, a demand for such the, liquid crystal display is significantly growing. In these liquid crystal display technologies, it is one of the essential techniques to align liquid crystals in a desired direction.

Conventionally, as a common method for aligning the liquid crystal, there has been used a contact-type rubbing process comprising applying a polymer film formed of a polymer such as polyimide on a substrate such as glass, and rubbing a surface of the resulting substrate using fibers such as nylon and polyester in a predetermined direction. However, in the contact-type rubbing process, fine dust may be generated or electrostatic discharge (ESD) may occur when the fibroid materials are rubbed with the polymer film, and severe problems may occur during the production of liquid crystal panels due to the troubles of the process.

Therefore, many studies have been recently made to produce an aligning layer using a novel contactless-type process in order to avoid the above problems of the contact-type rubbing process.

Examples of the contactless-type process of producing the aligning layer include an optical alignment process, an energy beam alignment process, a vapor deposition alignment process, and an etching process using lithography. Among these processes, the most realizable process is an optical alignment process, in which a linearly polarized light is radiated on a photosensitive polymer thin layer, to cause an anisotropic chemical reaction, and as a result to induce liquid crystal aligning.

The optical alignment process can be classified into optical isomerization, optical polymerization, and optical resolution processes, according to its reaction mechanism. Among them, the optical resolution has greatly attracted attention, which uses a polyimide thin layer, previously widely commercialized as an aligning layer. The polyimide for the optical resolution is a polymer in the linear form. The optical resolution inevitably leads to generation of the decomposed by-products in the small units by selectively photo-decomposing the polymer backbone consistent with the linearly polarized light and inducing the liquid crystal aligning, thereby photo-decomposing the polyimide. Such the decomposed by-product can cause very serious problem in the view of alignment stability and long-term reliability, particularly image sticking, practically upon the preparation of a liquid crystal display. The problem caused in the view of alignment stability, long-term reliability, and image sticking is arising as the largest problem which blocks the commercialization of the optical alignment process.

Therefore, there exists a need of a liquid crystal aligning layer, obtained by removing the decomposed by-products of the polyimide generated by the optical resolution, and thus promoting the alignment stability, and improving long-term reliability and image sticking.

DISCLOSURE

[Technical Problem]

Accordingly, the present inventors have conducted studies into a liquid crystal aligning layer having improved alignment stability, long-term reliability and image sticking, and as a result they have found that the liquid crystal aligning layer comprising an oligoimide or oligoamic acid can have an effect of improvement in alignment property, thermal stability, and image sticking by introducing a thermocurable or photocurable functional group onto at least one end of the oligoimide or oligoamic acid backbone, thereby leading to completion of the present invention.

[Technical Solution]

The present invention provides a composition for liquid crystal aligning comprising an oligoimide or oligoamic acid, which comprises a thermocurable or photocurable functional group on at least one end of the oligoimide or oligoamic acid backbone.

Further, the present invention provides a liquid crystal aligning layer prepared from the composition for liquid crystal aligning.

Further, the present invention provides a liquid crystal display comprising the liquid crystal aligning layer.

[Advantageous Effects]

The composition for liquid crystal aligning according to the present invention can minimize the generation of the decomposed by-products, which had been generated upon the use of polyimides, by introducing a thermocurable or photocurable functional group onto at least one end of the oligoimide or oligoamic acid backbone, instead of the conventional polyimides, and has an excellent effect of improvement in alignment property, thermal stability, and image sticking.

[Best Mode]

The present invention provides a composition for liquid crystal aligning comprising an oligoimide or oligoamic acid, which comprises a thermocurable or photocurable functional group on at least one end of the oligoimide or oligoamic acid backbone.

Further, the present invention provides a liquid crystal aligning layer prepared from the composition for liquid crystal aligning.

Further, the present invention provides a liquid crystal display comprising the liquid crystal aligning layer.

Hereinbelow, the present invention will be described in detail.

The composition for liquid crystal aligning of the present invention is characterized in that a thermocurable or photocurable functional group is introduced onto at least one end of the oligoimide or oligoamic acid backbone so as to introduce a curable functional group, as well as to maximize the effect of the curable functional group.

Generally, polyimide is photo-decomposed to generate decomposed by-products in small units. In the present invention, an oligoimide or oligoamic acid having a thermocurable or photocurable functional group introduced onto at least one end of the backbone is used instead of the conventionally used polyimide, and thus the decomposed by-products of the oligoimide or oligoamic acid, generated by photo-decomposition are in turn polymerized through a subsequent curing process of the curable functional group, and do not exist as a decomposed by-product any longer. As such, an effect of remarkable improvement in alignment stability and image sticking will be exhibited.

The oligomer used in the present invention is a polymer derived from small units, with a number average molecular weight preferably in the range of 500 to 30,000, and more preferably in the range of 500 to 9,000.

The oligomer form, as compared with the polymer form, has an advantage to maximize the curing effect in a subsequent process, by further improving the density of the curable functional group.

Furthermore, the polymer prepared by the introduction a curable functional group onto the end of an oligoimide or oligoamic acid is in the web form, and can provide an aligning layer which is more rigid and stable than a polyimide as a linear polymer. Further, the polyimide is dissolved only in a solvent of NMP (N-Methylpyrrolidone), while the oligoimide or oligoamic acid is dissolved in any kind of the solvents, thus providing larger diversity in selection of the solvent. Further, in a process for producing a thin layer, the polyimide can be subject only to a roll printing mode, while the oligoimide or oligoamic acid can be subject to a roll printing mode, as well as an ink-jet mode, and thus can be further applied under consideration in selection of a process for producing a thin layer.

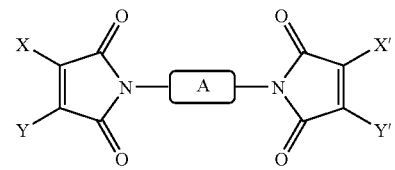

[Formula 1]

wherein

A is an oligoimide or oligoamic acid,

X, X', Y, and Y' are each independently hydrogen, alkyl, aryl, halogen, or nitrile, and the number average molecular weight is 500 to 30,000.

In the formula 1, alkyl preferably has 1 to 6 carbon atoms, and more preferably, is exemplified by methyl, ethyl, propyl, butyl or the like.

In the formula 1, aryl preferably has 5 to 20 carbon atoms, and more preferably, is exemplified by phenyl, naphthalene, anthracene or the like.

In the formula 1, halogen is preferably F, Cl, Br or the like.

In the composition for liquid crystal aligning of the present invention, since the oligoimide or oligoamic acid has a thermocurable or photocurable functional group, particularly maleimide introduced onto at least one end of the backbone, it can be cured by light or heat as it is without addition of a catalyst, and even after curing, by-products of volatile components are not generated.

The cured form of the oligoimide or oligoamic acid having maleimide introduced onto at least one end of the oligoimide or oligoamic acid backbone usable in the present invention can be represented by the following formula 2.

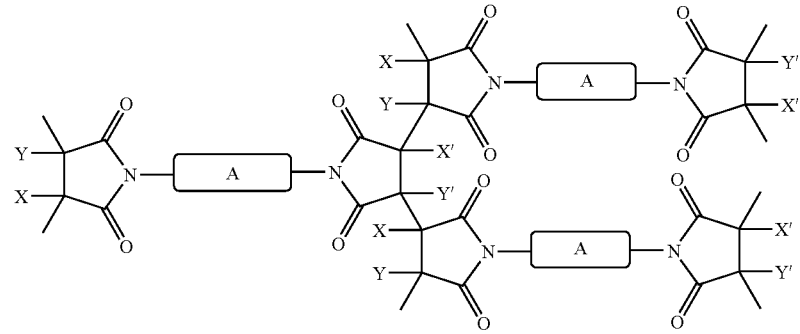

[Formula 2]

Examples of the curable functional group can include maleimide, nadimide, propargyl ether, acetylene, benzocyclobutane and cyanate, and particularly preferred is maleimide in the present invention.

The maleimide is cured by light, as well as by heat, and thus an oligoimide or oligoamic acid having maleimide introduced onto at least one end of the oligoimide or oligoamic acid backbone exhibits the most excellent characteristics.

The oligoimide or oligoamic acid having maleimide introduced onto at least one end of the oligoimide or oligoamic acid backbone usable in the present invention can be represented by the following formula 1.

wherein

A's are the same as or different from each other, and are each an oligoimide or oligoamic acid, and X, X', Y, and Y' are each independently hydrogen, alkyl, aryl, halogen, or nitrile.

The oligoimide or oligoamic acid used for the composition for liquid crystal aligning of the present invention can be prepared by polycondensation of diamine and dianhydride, which are preferably cyclic diamine and cyclic dianhydride, respectively, in the photo-decomposed form.

Particularly, as the cyclic diamine, preferred is an aromatic diamine, and specific examples thereof include, but are not limited thereto, phenylenediamine, diaminobiphenyl, methylenedianiline, oxydianiline, thiodianiline, diaminobenzophenone, diaminonaphthalene, and diaminoanthracene. Further, examples of cyclic dianhydride include, but are not limited thereto, pyromellitic acid dianhydride, biphthalic acid dianhydride, oxydiphthalic acid dianhydride, benzophenonetetracarboxylic acid dianhydride, hexafluoroisopropylidene diphthalic acid dianhydride, cycloalkyl dianhydride, and bicycloalkyl dianhydride.

The composition for liquid crystal aligning according to the present invention may contain common solvents or additives, which are known in the art, in addition to the oligoimide or oligoamic acid.

Furthermore, the present invention provides a liquid crystal aligning layer prepared from the composition for liquid crystal aligning.

The liquid crystal aligning layer can be prepared by a conventional method known in the art.

In a specific embodiment, the liquid crystal aligning layer according to the present invention can be prepared in the following manner, but not limited thereto.

The oligoimide or oligoamic acid of the formula 1 is dissolved in a solvent to prepare a liquid crystal alignment solution, and the liquid crystal alignment solution is applied onto a glass substrate, on which indium tin oxide (ITO) is applied using a process such as spin coating, roll coating, or inkjet coating. Examples of the usable solvent include, but are not limited to cyclopentanone, cyclohexanone, N-methylpyrolidone, DMF (N,N'-dimethylformamide), DMAC (N,N'-dimethylacetamide), GBL (γ-butyrolactone), 2-butoxyethanol, THF (tetrahydrofuran), $CCl_4$ or a mixture thereof.

The concentration of the liquid crystal alignment solution, the type of solvent, and the application process can be determined according to the kind and use of each oligoimide or oligoamic acid.

Specifically, the oligoimide or oligoamic acid is dissolved in a weight ratio of 1 to 30 based on the solvent, passed through a filter having a hole size of 0.2 to 1 μm to remove residual floating materials, applied on a glass substrate on which the indium tin oxide is applied by means of spin coating, roll coating, or inkjet coating, and heated at 60 to 150° C. for 1 to 10 min to vaporize the solvent. The thickness of the applied aligning layer is 80 to 3,000 Å, and preferably 500 to 1,500 Å. The glass substrate on which the aligning layer applied is subjected to two processes including exposing using linearly polarized ultraviolet rays and heat treatment. The linearly polarized ultraviolet rays are selectively radiated on a region where alignment is performed. The ultraviolet rays may be radiated using a high pressure mercury lamp, a xenon lamp, or pulse ultraviolet rays. In connection with this, the exposure intensity depends on the kind of oligoimide or oligoamic acid. Energy of 50 $mJ/cm^2$ to 10 $J/cm^2$, and preferably 200 $mJ/cm^2$ to 5 $J/cm^2$, is radiated. By radiation of the linearly polarized ultraviolet rays, the direction-selective coupling-cleavage in the oligoimide or oligoamic acid induces the liquid crystal arrangement, while the optical reaction of maleimide on the end of the oligoimide or oligoamic acid backbone causes a partial curing process. Then, the exposed substrate is subjected to a heat treatment process. In the present invention, the heat treatment may be performed after the exposing to maximize the alignment. The heat treatment is performed at 100 to 250° C. for 10 min to 1 hour.

After the heat treatment is finished, the two substrates are attached using an adhesive and a spacer to form a single cell. The liquid crystal is injected into the attached liquid crystal cell. After the liquid crystals are sealed, the heat treatment is performed at 150° C. for 10 min to align the liquid crystals in an arrangement direction of the aligning layer. By performing a thermocuring process, by the thermocurable or photocurable functional group, maleimide itself, or an interactive reaction between maleimide and amine provides a stable alignment structure in a rigid web form.

Through these processes, the photo-decomposed by-products are absorbed in the curing process, and thus the alignment property is not adversely affected any longer, or image sticking or the like is not severely affected.

Further, the present invention provides a liquid crystal display comprising the liquid crystal aligning layer.

The liquid crystal display can be prepared by a conventional method known in the art.

The liquid crystal display according to the present invention has a thermocurable or photocurable functional group introduced onto at least one end of the oligoimide or oligoamic acid backbone, and thus has an excellent effect of improvement in alignment property, thermal stability, and image sticking.

MODE FOR INVENTION

A better understanding of the present invention may be obtained in light of the following Examples and Comparative Examples which are set forth to illustrate, but are not to be construed to limit the present invention.

EXAMPLES

Preparative Example 1

Preparation of Oligomer 1 Solution 5 g of 4,4'-biphthalic anhydride and 2.83 g of 4,4'-oxydianiline were dissolved in 80 ml of NMP, and the solution was stirred at normal temperature for 8 hours. Thereafter, 1.06 g of 4-aminophenyl maleimide was added thereto, and the mixture was further stirred at normal temperature for 8 hours to prepare a 10 wt % oligomer 1 solution. The molecular weight of thus obtained oligomer 1 was determined by GPC, and as a result, the number average molecular weight (Mn) and the weight average molecular weight (Mw) were found to be 7,600 and 15,000, respectively.

Preparative Example 2

Preparation of Oligomer 2 Solution 5 g of cyclobutane tetracarboxylic anhydride and 2.06 g of 1,4-phenylene diamine were dissolved in 85 ml of NMP, and the solution was stirred at normal temperature for 8 hours. Thereafter, 2.4 g of 4-aminophenyl maleimide was added thereto, and the mixture was further stirred at normal temperature for 8 hours to prepare a 10 wt % oligomer 2 solution. The molecular weight of thus obtained oligomer 2 was determined by GPC, and as a result, the number average molecular weight (Mn) and the weight average molecular weight (Mw) were found to be 6,900 and 11,200, respectively.

Preparative Example 3

Preparation of Oligomer 3 Solution 5 g of 3,3', 4,4'-benzophenonetetracarboxylic dianhydride and 2.5 g of 4,4'-diaminobiphenyl were dissolved in 74 ml of NMP, and the solution was stirred at normal temperature for 8 hours. Thereafter, 730 mg of 4-aminophenyl maleimide was added thereto, and the mixture was further stirred at normal temperature for 8 hours to prepare a 10 wt % oligomer 3 solution. The molecular weight of thus obtained oligomer 3 was determined by GPC, and as a result, the number average molecular weight (Mn) and the weight average molecular weight (Mw) were found to be 8,300 and 16,200, respectively.

Comparative Preparative Example 1

Preparation of Polymer 1 Solution 5 g of 4,4'-biphthalic anhydride and 3.4 g of 4,4'-oxydianiline were dissolved in 75.6 ml of NMP, and the solution was stirred at normal temperature for 8 hours to prepare a 10 wt % polymer 1 solution. The molecular weight of thus obtained polymer 1 was determined by GPC, and as a result, the number average molecular weight (Mn) and the weight average molecular weight (Mw) were found to be 56,000 and 110,000, respectively.

Comparative Preparative Example 2

Preparation of Polymer 2 Solution 5 g of cyclobutane tetracarboxylic anhydride and 2.75 g of 1,4-phenylene diamine were dissolved in 70 ml of NMP, and the solution was stirred at normal temperature for 8 hours to prepare a 10 wt % polymer 2 solution. The molecular weight of thus obtained polymer 2 was determined by GPC, and as a result, the number average molecular weight (Mn) and the weight average molecular weight (Mw) were found to be 47,000 and 96,000, respectively.

Comparative Preparative Example 3

Preparation of Polymer 3 Solution 5 g of 3,3', 4,4'-benzophenonetetracarboxylic dianhydride and 2.86 g of 4,4'-diaminobiphenyl were dissolved in 70 ml of NMP, and the solution was stirred at normal temperature for 8 hours to prepare a 10 wt % polymer 3 solution. The molecular weight of thus obtained polymer 3 was determined by GPC, and as a result, the number average molecular weight (Mn) and the weight average molecular weight (Mw) were found to be 85,000 and 135,000, respectively.

Example 1

Preparation of Liquid Crystal Aligning Layer

1. Preparation of liquid crystal alignment solution 10 ml of NMP and 10 ml of 2-buthoxyethanol were mixed with 10 ml of the oligomer 1 solution prepared in Preparative Example 1, and the mixture was passed through a filter having a hole size of 0.45 μm to remove the residual floating materials, thereby preparing a liquid crystal alignment solution.
2. Preparation of Liquid Crystal Cell The liquid crystal alignment solution that was produced in Item 1 was applied on an ITO substrate to a thickness of 800 Å at a rate of 4,500 rpm for 25 sec using spin coating. The substrate on which the liquid crystal alignment solution was applied was heated at 150° C. for 10 min to vaporize the solvent. The substrate on which the aligning layer was applied was exposed to polarized ultraviolet rays in the intensity of 20 mW/cm$^2$ using a high pressure mercury lamp for 10 sec (200 mJ), 50 sec (1 J), and 250 sec (5 J). After the exposing, the substrate on which the aligning layer was applied was subjected to the heat treatment at 200° C. for 1 hour for comparison of the thermal stability of the aligning layer. An electrically controlled birefringence (ECB) type of a liquid crystal cell having an interval of 60 mm was produced using the exposed and heat treated substrate by means of a double-sided adhesive tape. The IPS (In-Plane-Switching) type of liquid crystal was injected into the produced electrically controlled birefringence type of a liquid crystal cell using a capillary tube to complete the production of the electrically controlled birefringence type of a liquid crystal cell. The produced liquid crystal cell was subjected to the heat treatment at 100C. for 2 min.

Example 2

In the same manner as in Example 1 except that in Example 1, the oligomer 2 solution of Preparative Example 2 was used instead of the oligomer 1 solution of Preparative Example 1, a liquid crystal aligning layer was prepared.

Example 3

In the same manner as in Example 1 except that in Example 1, the oligomer 3 solution of Preparative Example 3 was used instead of the oligomer 1 solution of Preparative Example 1, a liquid crystal aligning layer was prepared.

Comparative Example 1

In the same manner as in Example 1 except that in Example 1, the polymer 1 solution of Comparative Preparative Example 1 was used instead of the oligomer 1 solution of Preparative Example 1, a liquid crystal aligning layer was prepared.

Comparative Example 2

In the same manner as in Example 1 except that in Example 1, the polymer 2 solution of Comparative Preparative Example 2 was used instead of the oligomer 1 solution of Preparative Example 1, a liquid crystal aligning layer was prepared.

Comparative Example 3

In the same manner as in Example 1 except that in Example 1, the polymer 3 solution of Comparative Preparative Example 3 was used instead of the oligomer 1 solution of Preparative Example 1, a liquid crystal aligning layer was prepared.

Experiment Example 1

Alignment Property

In order to evaluate the alignment property of the liquid crystal aligning layers prepared in Examples 1 to 3 and Comparative Examples 1 to 3, the following experiment was carried out.

The liquid crystal cells produced in Examples 1 to 3 and Comparative Examples 1 to 3 were put between the two orthogonal polarizing plates to observe the shading, the alignment uniformity or the like of the liquid crystal cell, with the naked eye and a microscope.

The alignment state of the liquid crystal cell was evaluated by the following criteria.

Evaluation criteria: Presence of flow mark of liquid crystal and occurrence alignment disclination/cm$^2$ 5: No alignment disclination, and very excellent alignment state, 4: No alignment disclination, but fine liquid crystal flow mark observed, 3: less than 5 alignment disclinations occurred, and fine liquid crystal flow mark observed, 2: 5 or more and 10 or less alignment disclinations occurred, and fine liquid crystal flow mark observed, 1: more than 10 alignment disclinations occurred, and lot of fine liquid crystal flow marks observed, 0: No alignment.

Evaluation on the alignment property was performed using two plates without heat treatment after exposure.

The results of the alignment property are shown in Table 1.

Experiment Example 2

Thermal Stability

In order to evaluate the thermal stability of the liquid crystal aligning layers prepared in Examples 1 to 3 and Comparative Examples 1 to 3, the following experiment was carried out.

Two plates after exposure in Examples 1 to 3, and Comparative Examples 1 to 3 were subject to heat treatment, and then a cell was prepared, and reduction in the alignment property was observed for evaluation on the thermal stability.

The results of the thermal stability are shown in Table 1.

Evaluation criteria:

5: No difference in alignment property grades before and after evaluation,

4: Reduction by 1 grade in alignment property grades before and after evaluation, 3: Reduction by 2 grades in alignment property grades before and after evaluation, 2: Reduction by 3 grades in alignment property grades before and after evaluation, 1: Reduction by 4 grades in alignment property grades before and after evaluation, 0: No alignment.

Experiment Example 3

Effect of Improvement in Image Sticking

In order to evaluate the effect of improvement in the image sticking of the liquid crystal aligning layers prepared in Examples 1 to 3, and Comparative Examples 1 to 3, the following experiment was carried out.

A voltage of 7 V was applied onto the liquid crystal cells prepared in Examples 1 to 3, and Comparative Examples 1 to 3, and 12 hours later, the voltage was off. Then, the change in the luminance was evaluated by observation with the naked eye.

As the evaluation criteria, the time for restoring the image sticking was measured. Here, if a voltage was applied on to the liquid crystal cell, the luminance was change, and even when the voltage was off, the luminance was not readily restored by a image sticking effect, but restored after a certain period of time, wherein the time taken for the restoring was measured. It can be said that as the time for restoring the image sticking is shorter, the aligning layer is more excellent.

The image sticking characteristics are shown in Table 1.

TABLE 1

| Liquid crystal aligning layer | | Alignment property | Thermostability | Image sticking characteristics (Restoration time) |
|---|---|---|---|---|
| Example | 1 | 5 | 4 | 4 min and 40 sec |
|  | 2 | 5 | 5 | 2 min |
|  | 3 | 5 | 5 | 1 min and 50 sec |
| Comparative Example | 1 | 3 | 2 | 10 min and 10 sec |
|  | 2 | 4 | 3 | 5 min and 30 sec |
|  | 3 | 5 | 3 | 7 min and 40 sec |

As shown in Table 1, the liquid crystal aligning layer according to the present invention was excellent in any of alignment property, thermal stability, and image sticking characteristics.

The invention claimed is:

1. A composition for liquid crystal aligning comprising an oligoimide or oligoamic acid, which comprises a thermocurable or photocurable functional group selected from a group consisting of maleimide, nadimide, propagyl ether, acetylene, benzocyclobutane, and cyanate, on at least one end of the oligoimide or oligoamic acid backbone and has a number average molecular weight of 500 to 30,000.

2. A liquid crystal aligning layer produced from the composition for liquid crystal aligning according to claim 1.

3. A liquid crystal display comprising the liquid crystal aligning layer according to claim 2.

4. The composition for liquid crystal aligning according to claim 1, wherein the thermocurable or photocurable functional group is maleimide.

5. A liquid crystal aligning layer produced from the composition for liquid crystal aligning according to claim 4.

6. A liquid crystal display comprising the liquid crystal aligning layer according to claim 5.

7. The composition for liquid crystal aligning according to claim 1, wherein the oligoimide or oligoamic acid is represented by the following formula 1:

[Formula 1]

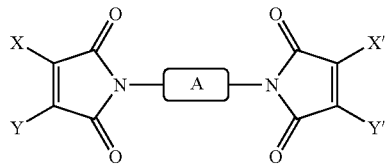

wherein
A is an oligoimide or oligoamic acid,
X, X', Y, and Y' are each independently hydrogen, alkyl, aryl, halogen, or nitrile, and the number average molecular weight is 500 to 30,000.

8. A liquid crystal aligning layer produced from the composition for liquid crystal aligning according to claim 7.

9. A liquid crystal display comprising the liquid crystal aligning layer according to claim 8.

10. The composition for liquid crystal aligning according to claim 7, wherein the alkyl is selected from the group consisting of methyl, ethyl, propyl, and butyl.

11. The composition for liquid crystal aligning according to claim 7, wherein the aryl is selected from the group consisting of phenyl, naphthalene, and anthracene.

12. The composition for liquid crystal aligning according to claim 7, wherein the halogen is selected from the group consisting of F, Cl, and Br.

13. The composition for liquid crystal aligning according to claim 1, wherein the cured form of the oligoimide or oligoamic acid comprising a thermocurable or photocurable functional group on at least one end of the oligoimide or oligoamic acid backbone is represented by the following formula 2;

14. A liquid crystal aligning layer produced from the composition for liquid crystal aligning according to claim 13.

15. A liquid crystal display comprising the liquid crystal aligning layer according to claim 14.

16. The composition for liquid crystal aligning according to claim 1, wherein the oligoimide or oligoamic acid is prepared by polycondensation of diamine and dianhydride.

17. A liquid crystal aligning layer produced from the composition for liquid crystal aligning according to claim 16.

18. A liquid crystal display comprising the liquid crystal aligning layer according to claim 17.

19. The composition for liquid crystal aligning according to claim 16, wherein the diamine is selected from the group consisting of phenylenediamine, diaminobyphenyl, methylenedianiline, oxydianiline, thiodianiline, diaminobenzophenone, diaminonaphthalene, and diaminoanthracene.

20. A liquid crystal aligning layer produced from the composition for liquid crystal aligning according to claim 19.

21. A liquid crystal display comprising the liquid crystal aligning layer according to claim 20.

22. The composition for liquid crystal aligning according to claim 16, wherein the dianhydride is selected from the group consisting of pyromellitic acid dianhydride, biphthalic acid dianhydride, oxydiphthalic acid dianhydride, benzophenonetetracarboxylic acid dianhydride, hexafluoroisopropylidene diphthalic acid dianhydride, cycloalkyl dianhydride, and bicycloalkyl dianhydride.

[Formula 2]

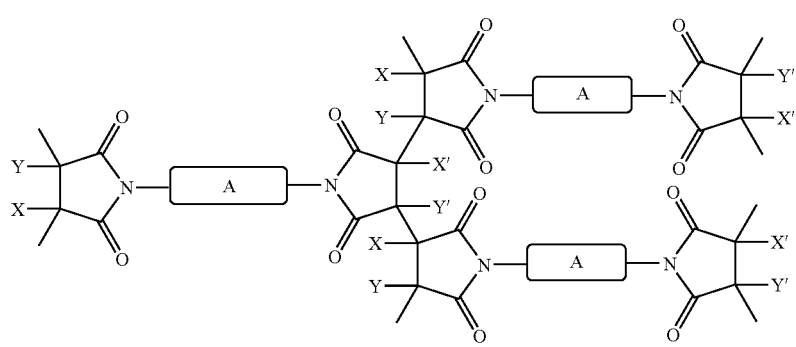

wherein
A's are the same as or different from each other, and are each an oligoimide or oligoamic acid, and
X, X', Y, and Y' are each independently hydrogen, alkyl, aryl, halogen, or nitrile.

23. A liquid crystal aligning layer produced from the composition for liquid crystal aligning according to claim 22.

24. A liquid crystal display comprising the liquid crystal aligning layer according to claim 23.

* * * * *